June 14, 1960
A. R. BURCH
2,940,611
AUTOMOBILE TRANSMISSION DOLLY
Filed Oct. 30, 1956
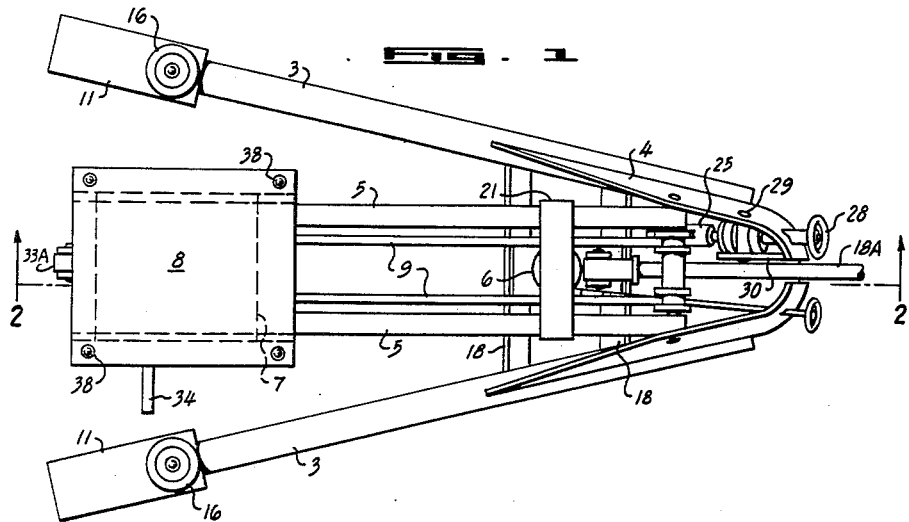
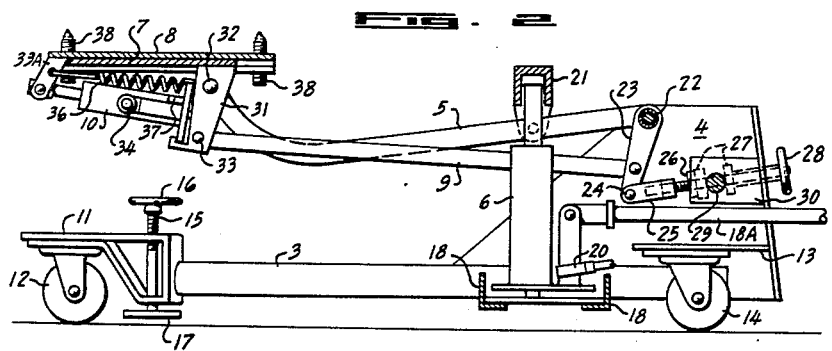
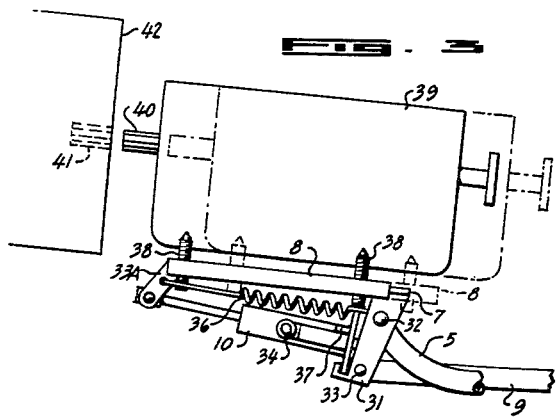
INVENTOR:
Arthur R. Burch
BY Lothrop + West
ATTORNEYS

United States Patent Office 2,940,611
Patented June 14, 1960

2,940,611

AUTOMOBILE TRANSMISSION DOLLY

Arthur R. Burch, 1860 Bay Front, Berkeley, Calif.

Filed Oct. 30, 1956, Ser. No. 619,279

2 Claims. (Cl. 214—1)

My invention relates to a jack operated device for handling automobile and truck transmissions, and is adapted to handle other similar units under like conditions.

Transmissions, particularly truck transmissions, are heavy. The handling of same, especially when being removed or installed is a time consuming and strenuous operation unless the properly designed mechanical device is employed.

Many mechanical devices, commonly known as transmission dollys, have been manufactured and put into use employing a lifting means and a rolling means but require a time consuming trial and error operation when, during the installation or removal of transmission the spline shaft of the transmission is not inserted or removed in the same plane as the spline hole to which it is being inserted or removed. Devices depending upon ground engaging wheels for installation of transmission splines demand a trial and error operation. Even a grain of sand on the floor will throw the spline out of line when these devices are employed.

An object of my invention, therefore is to provide a novel jack device that will force the insertion, or removal of the transmission spline shaft in the same plane as the spline hole of the clutch, independent of the ground engaging wheels.

Another object of the invention is to provide, in combination with the jack unit device, locking means between floor and transmission dolly to prevent movement due to reaction of the jacking device.

Another object of the invention is to provide a means for closing the jacking device without need for manually forcing the closing.

Another object of the invention is to support the jacking device in such a manner that a common lift jack of the hydraulic type may be employed, even though a jack of this type if allowed to assume a horizontal position will not function.

The invention also comprises novel details of construction, and novel arrangement of parts and these will more fully appear in the course of the following description. However, the drawing herein merely shows one embodiment of the invention.

In the drawings: Figure 1 is a top plan view of the transmission dolly; Figure 2 is a longitudinal, sectional, elevation view, as taken on line 2—2 of Figure 1; Figure 3 is an elevation view, showing the operation of the jacking device when handling a transmission.

The transmission dolly that is illustrated comprises, generally converging side members 3, an erect frame 4, a pair of arms 5 movable in vertical planes with respect to the side members or base 3, a lifting jack unit 6 for effecting said movement, a cradle support 7 for supporting and providing guides for the cradle 8, a pair of parallel functioning arms 9, and a jacking device 10 for movement of cradle 8 on cradle support 7.

The device is substantially symmetrical so but one side is described. A side member 3 is joined at the diverged end to a caster holding unit 11 to which is attached a swivel caster 12. The erect frame 4 at the converging end of side member 3 is joined to a caster holding unit 13, to which is attached a swivel caster 14.

The caster holding unit 11 is drilled and tapped for a vertical screw 15, to which is attached, at the upper end a hand wheel 16, and to the lower end a pad 17 for preventing horizontal movement of the transmission dolly when the pad 17 is pressed to the floor through turning of the screw 15.

The side arm 3 is also joined by angle iron cross members 18, which support the lifting jack 6. Vertical movement of the handle 18A, and operation of a jack valve 20 provides the lifting force which is transmitted through a bridge 21 to the arms 5, which are hinged at one end on a pin 22. The pin 22 is attached to the frame 4. The pin 22 also is a hinge for an arm 23 which is in turn hinged to the arm 9. Also attached to the arm 9 by a pin 24 is a screw clevis 25 which is a part of a screw mechanism 28 for changing of the angle of the cradle support. Other parts of the screw mechanism include a stop ring 26, which is fastened to the screw thereby transmitting the thrust of the screw to a bearing 27. A hand wheel 28 also being fastened to the screw, transmits thrust, when same is in opposite direction, to the bearing 27. The screw passes through, and is supported by, a pin 29 which is held in place by a frame plate 30 attached to the frame 4.

The support cradle 7 is joined and supported by a support 31, on a hinge pin 32, which passes through the arms 5, and is also held in the desired plane by the arms 9 hinged by a hinge pin 33.

The jack unit 10, with a handle 34, provides the thrust, for movement of the cradle 8, through a hinge bracket 33A attached to cradle 8. A tension spring 36 is attached, at one end to the bracket 33A, and to the hinge pin 32 at the opposite end for closing the jack when a valve 37 is opened.

The jack unit 10 is held in a plane at an angle above, and relative to the horizontal, by supporting the base of the jack at a lower point than the upper end attached to the bracket 33A, although the cradle 8 is in a horizontal plane. The stop ring 26 is adjusted to prevent the jack unit 10 from assuming a horizontal position.

Pins 38 are provided to hold a transmission in proper position on the cradle 8. Figure 3 shows a transmission 39 in position on the cradle 8 with its spline shaft 40 being forced by the jack unit 10 into a spline hole 41 of a clutch 42 and at the plane of or along the axis of the spline hole.

Having thus described my invention, what I claim and desire to secure by Letters Patent is:

1. A transmission dolly comprising a base, a pair of longitudinal upper arms, means for pivoting said upper arms at one end thereof to said base for rotation about a first transverse axis, a cradle support, means for pivoting said upper arms at the other end thereof to said cradle support for rotation about a second transverse axis, a pair of depending arms, means for pivoting said depending arms on said base for rotation about said first transverse axis, means interconnecting said depending arms and said base for moving said depending arms into any selected pivoted position, a pair of longitudinal lower arms, means for pivoting said lower arms at one end thereof to said depending arms for rotation about a third transverse axis, means for pivoting said lower arms at the other end thereof to said cradle support for rotation about a fourth transverse axis, a cradle, means on said cradle for engaging an automotive transmission, means for mounting said cradle for longitudinal sliding movement on said cradle support, and means interconnecting said cradle support and said cradle for sliding said cradle longitudinally on said cradle support.

2. A transmission dolly comprising a base having an upstanding frame thereon, a cross pin pivoted in said upstanding frame for rotation about a first transverse axis, a pair of longitudinal upper arms at one end thereof secured to said cross pin, a cradle support, means for pivoting said upper arms at the other end thereof to said cradle support for rotation about a second transverse axis, a pair of depending arms journalled on said cross pin for rotation about said first transverse axis, a pair of longitudinal lower arms, means for pivoting said lower arms at one end thereof to said depending arms for rotation about a third transverse axis, means for pivoting said lower arms at the other end thereof to said cradle support for rotation about a fourth transverse axis, a cradle, means on said cradle for engaging an automotive transmission means for sliding said cradle longitudinally on said cradle support, means for pivoting said depending arms about said first transverse axis, and means for pivoting said upper arms about said first transverse axis.

References Cited in the file of this patent
UNITED STATES PATENTS

| | | |
|---|---|---|
| 1,993,245 | Meron | Mar. 5, 1935 |
| 2,523,734 | Stephenson et al. | Sept. 26, 1950 |
| 2,613,822 | Stanley | Oct. 14, 1952 |
| 2,712,874 | Murray | July 12, 1955 |
| 2,782,946 | Hough | Feb. 26, 1957 |
| 2,789,711 | Burrus | Apr. 23, 1957 |